March 19, 1968     P. J. METZ, JR     3,374,303
METHOD FOR MANUFACTURING IMPRINTED PLASTIC FILM
Filed Feb. 14, 1964     2 Sheets-Sheet 1
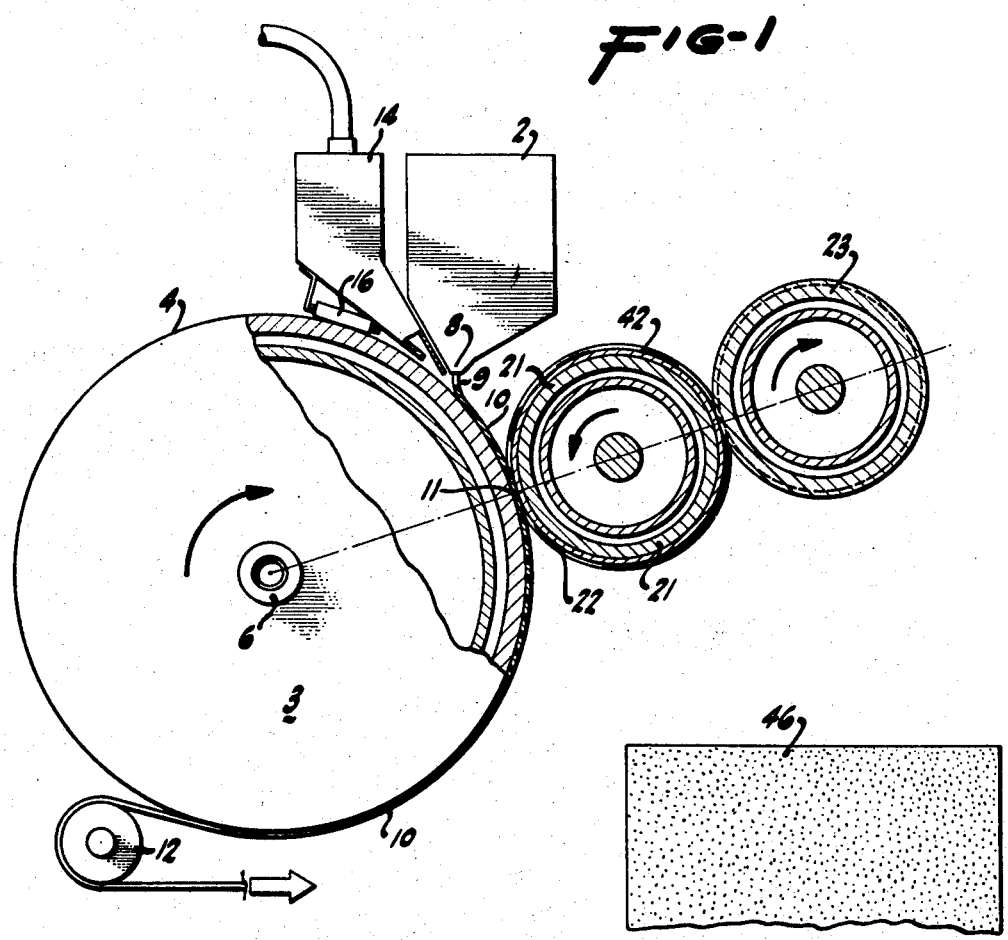
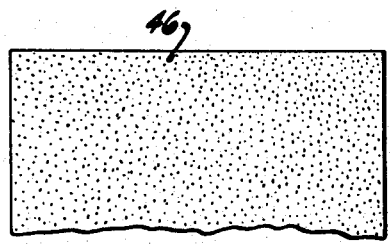
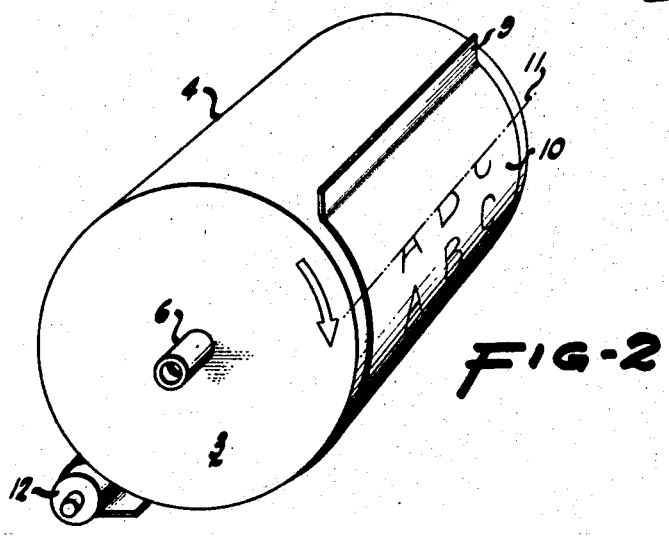
INVENTOR.
PETER J. METZ, JR.
BY Stanley Bielen
ATTORNEY

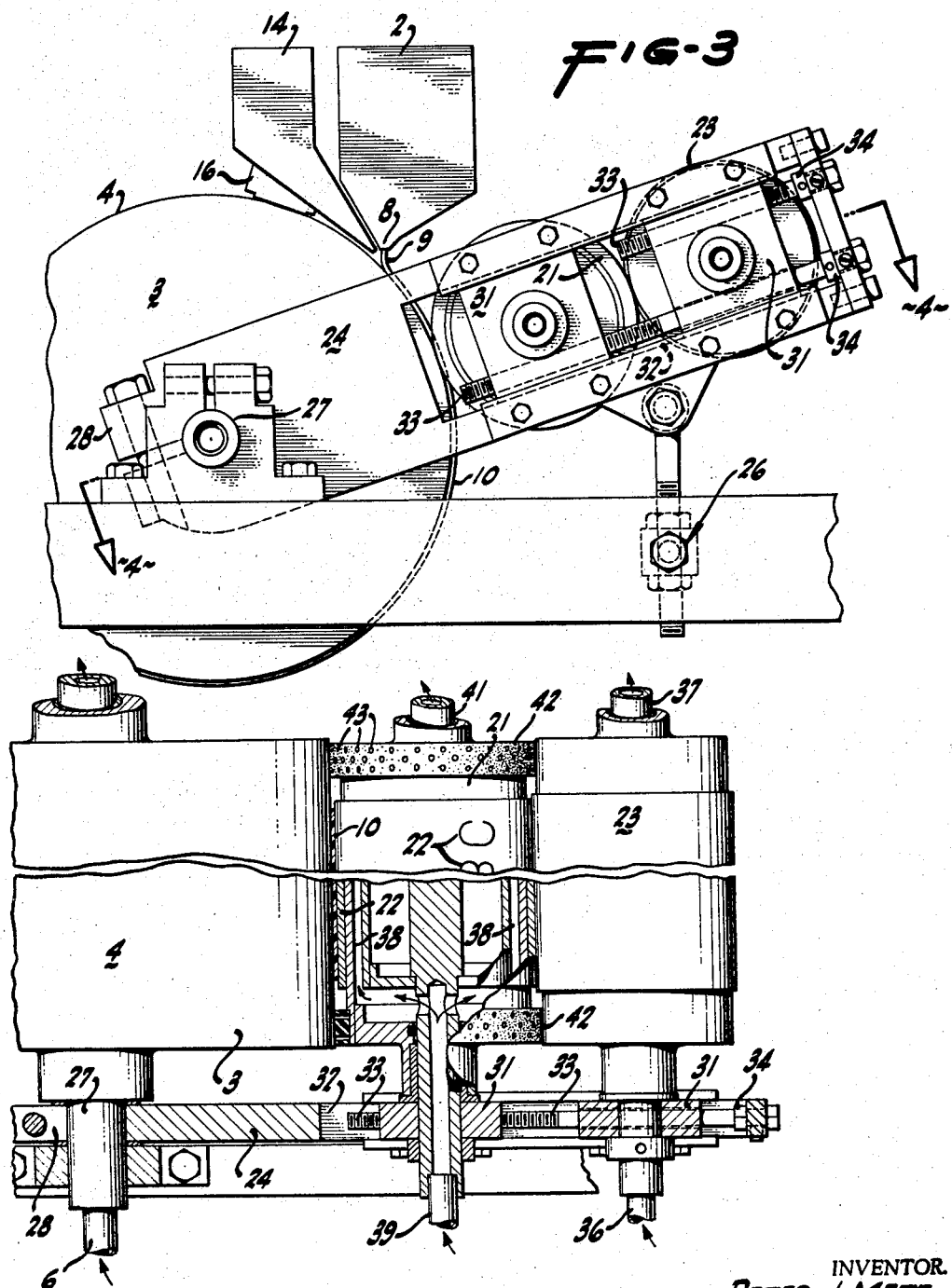

United States Patent Office 3,374,303
Patented Mar. 19, 1968

3,374,303
METHOD FOR MANUFACTURING IMPRINTED PLASTIC FILM
Peter J. Metz, Jr., Castro Valley, Calif., assignor to Crown Zellerbach Corporation, San Francisco, Calif., a corporation of Nevada
Filed Feb. 14, 1964, Ser. No. 344,857
10 Claims. (Cl. 264—216)

ABSTRACT OF THE DISCLOSURE

Polyolefin film is extruded in a viscous amorphous state onto a continuously moving chill roll. The film moves with one face in contact with the chill roll and, at a critical area where the polyolefin sets to a substantially solid semicrystalline state, known as the frost line, the film passes through a nip defined by the chill roll and a cooled rotary impression roll to effect impressions on the opposite face of the film.

---

This invention relates to imprinting plastic film, and more particularly, to the imprinting of polyolefin film, such as polyethylene and polypropylene.

Polyolefin film is usually formed by extruding the same from a conventional slotted extrusion die under heat and pressure onto a continuously moving smooth, cooled casting surface, such as a smooth surfaced so-called chill roll. The polyolefin is emitted from the die in a plastic or viscous amorphous state onto the chill roll, but after a relatively short distance of travel with the chill roll, the polyolefin sets sharply and substantially instantaneously to a substantially solid semi-crystalline state along a well defined zone known as the frost line. Such frost line is very readily observable by an operator because of the sharp transition which occurs when the polyolefin initially sets from the amorphous to the solid state, as it appears as a narrow hazy or frosty looking white band.

Pursuant to this invention, it has been found that if imprinting of the polyolefin film is effected at the frost line zone, either by applying printing characters or legends or roughening the surface of the polyolefin in a manner explained later, distinct markings or impressions are formed on the film somewhat akin to the so-called water marking effect well known in the manufacture of paper. These impressions whether large or small are clearly legible; particularly when held up so the light passes through the film or when the light strikes the film at approximately a 30 to 40° angle.

The imprinted areas are formed solely from the material of the film itself, and they have optical properties different from the remainder of the film about such imprinted areas, namely, a white, duller and materially less glossy appearance than the clear, highly transparent, and glossy areas of the remainder of the film. Tests have established that the density of the imprinted areas is slightly less than that of the remainder of the film resulting from the cooling rate of the imprinted areas being faster than the cooling rate of the remainder of the film.

This is because one face of the film which is in contact with the cool casting surface is cooled directly by such casting surface, while the opposite face of the film is also cooled at the imprinted areas by the application of imprinting means which simultaneously presses the imprinted areas. To enhance such differential cooling of the film at the imprinted areas, it is advantageous to cool the imprinting means by application of a cooling medium thereto. Cooling of the imprinting means also obviates the possibility of it sticking to the film which may be still slightly tacky at the frost line zone.

From the preceding, it is seen that the invention has for its objects, among others, the provision of an improved, simple and economical method and apparatus for effecting imprinting of plastic film, particularly polyolefin film which obviate the necessity of having to treat the film specially by numerous methods now commonly employed in the art to enable polyolefin film, such as polyethylene, to take printing impressions from printing inks; which do not require undue shut-down of the apparatus when it is desired to change from one imprinting means to another as would otherwise be the case were the imprinting means formed directly on a casting surface such as a chill roll; which will produce clear and distinct impressions and thus provide an improved imprinted film; and which can be utilized to form a dull finish over the entire surface area of a face of the film. Other objects of the invention will become apparent from a perusal of the following more detailed description, and accompanying drawings, in which:

FIG. 1 is a more or less schematic sectional elevation of the apparatus of the invention;

FIG. 2 is an isometric schematic view of the chill roll portion of the apparatus, illustrating the so-called frost line zone and imprinting on the film;

FIG. 3 is a fragmentary elevational view of a portion of the apparatus illustrating a form of mounting means for imprinting means and cooling means therefor employed in the apparatus;

FIG. 4 is a horizontal section taken in a plane indicated by line 4—4 in FIG. 3, with portions shown in elevation, and broken away to shorten the view;

FIG. 5 is a plan view of film illustrating a face thereof imprinted to provide a dull finished irregular surface.

With reference to FIG. 1, a suitable polyolefin extrusion apparatus of the type shown in assignee's co-pending application by Arthur N. Aronsen, Ser. No. 118,-362, filed June 20, 1961, entitled "Method and Apparatus for Controlling Extrusion of Material," (issued as Patent No. 3,154,068, dated Oct. 27, 1964), comprises a conventional die extruder 2 extending axially along conventional cooled rotatable casting roll 3 having a highly polished casting surface 4, usually chromium plated; the roll being driven by suitable variable speed drive means (not shown). Cooling fluid, usually water, is continuously fed in a conventional manner into the interior of chill roll 3 through inlet 6. Plastic material, such as polyethylene or polypropylene, is continuously fed into the extruder under pressure by suitable conventional means (not shown); and the extruder is maintained in heated condition by conventional means (not shown).

Continuous flow of the molten plastic in viscous state from the extruder is through extrusion slot 8 extending lengthwise of the casting or chill roll 3. It will be noted that a relatively short free section or sheet of unsupported extruded plastic indicated at 9 flows continuously from the discharge end of slot 8 to the location at which the material is deposited onto the movable casting surface 4. Then, as one face of the extruded polyolefin is in contact and travels with casting surface 4, the film 10 sets quickly after a relatively short distance of travel, from an amorphous to a solid self supporting crystalline state.

The zone at which polyolefin sets from an amorphous state to a solid crystalline state is indicated at 11 in FIG. 1 and also by phantom line 11 in FIG. 2, and is known as the frost line. Such frost line is in advance of the location at which the film is finally removed from the casting roll by conventional means including idler roll 12, and is wound in a roll by conventional winding mechanism (not shown).

To provide a control for maintaining the frost line substantially even, it is advantageous to employ a vacuum chamber 14 acting on the rear face of the unsupported amorphous free film section 9, and to maintain a slight vacuum in the order of 0.10 to 0.8 inch of water all along such rear face, as is explained in the aforementioned co-pending application. However, the vacuum chamber is not essential to the principle of this invention, but is desirable since it provides for more accurate control of the frost line.

Desirably, an axially extending barrier pad 16 is detachably mounted on the vacuum chamber in engagement with casting surface 4 for the purpose of enhancing maintenance of the vacuum. The pad also minimizes pumping of air between the extruded material and casting surface 4 which is caused by rotation of roll 3 in the direction of movement of film being formed; and it wipes the casting surface clean of oily material which collects thereon and which would otherwise impair the optical properties of the film.

Rotary impressing means, comprising impression roll 21, is provided at the frost line; and to enhance cooling of the exposed surface of imprinting elements 22 on the impression roll, a rotatable cooling roll 23 is mounted in engagement therewith. With reference to FIGS. 3 and 4, it will be noted that both impression roll 21 and cooling roll 23 are mounted for adjustment relative to each other and relative to casting roll 3. Such adjustable mounting means comprises an arm 24 pivotally mounted for adjustment about the axis of casting roll 3 adjacent each end thereof for supporting impression roll 21 and cooling roll 23.

Suitable adjustable stop means 26 is provided to hold the arms in any desired angularly adjusted fixed position; the inner ends of the arms being journalled on fixed shaft 27 and can be fixed in position by means of conventional split clamps 28. Both impression roll 21 and cooling roll 23 are radially adjustable relative to each other and to casting roll 3 by means of support bearings 31 mounted for slidable movement in a slot 32 formed in each arm 24 and which can be adjustable and fixedly held by suitable adjustable screws 33 connected to the respective bearings 31, and which can be locked in fixed position by lock nuts 34.

By the described arrangement, the entire mounting assembly for rolls 21 and 23 can be arcuately or angularly adjusted relative to casting surface 4 for positioning impression roll 21 at the desired location adjacent frost line 11. At the same time, each of rolls 21 and 23 can be radially adjusted to provide a desired pressure contact of the imprinting means 22 on film 10 in contact with chill roll 3, and with cooling roll 23 to effect most efficient heat transfer. It is important that impression roll 21 be in such angularly adjusted position relative to casting surface 4, that the imprinting means 22 thereon engages the film at the frost line zone, because if it engages the film ahead of such zone, the film is too soft to form an impression and damage to the film may occur. If the imprinting means engages the film beyond the frost line zone, no impression will be formed because of complete solidification and crystallization of the film. At the frost line zone, however, where the material solidifies sharply, the impression will be formed.

Cooling roll 23 is advantageous because, at the frost line, the film may be slightly tacky and hence stick to the imprinting elements 22. By cooling such elements, this insures against sticking. Any other cooling means for impression roll 21 can be provided, such as an air blast or knife directed along the entire length of roll 21. However, where tackiness at the frost line is no problem, the cooling means can be omitted because cooling of the imprinting means 22 as it travels through the atmosphere is sufficient to provide the faster cooling of the imprinted areas. The provision of cooling means 23 acting on imprinting means 22, enhances sharper printing, and is, therefore, desirably employed for this reason also.

Cooling roll 23 may be internally cooled in any conventional manner, desirably by water introduced at one end of the roll through a flexible hose 36 and discharged from the opposite end through flexible hose outlet 37. Impression roll 21 may be internally cooled, if desired, but this is not necessary. It may be provided with an internal jacket 38 through which cooling fluid is continuously passed from flexible inlet 39 and discharged from flexible outlet 41.

Imprinting elements 22 on impression roll 21 may be of any suitable character but it is advantageous to employ conventional arcuate rubber printing plates with resilient or yieldable, relatively soft rubber characters detachably mounted on impression roll 21 as on a conventional printing press cylinder. Rubber or any other deformable resilient or yieldable material such as Teflon or nylon, is desirable because their yieldability insures against damage to the film as it is being imprinted. Rubber characters of a Shore durometer hardness range of about 35 to 55 are preferred, and desirably about 40 Shore durometer hardness.

Impression roll 21 is driven at the same peripheral speed as casting roll 3 so that there can be no relative movement between imprinting means 22 and the casting roll. For simplicity of drive mechanism, impression roll 21 is driven frictionally from casting roll 3 by means of relatively soft rubber rings 42 at the ends of impression roll 21, which engage casting surface 4 of the casting roll. In turn, cooling roll 23 is similarly driven frictionally from impression roll 21 by these soft rubber rings 42 in engagement with its surface. To enhance traction, rings 42 are provided with pin hole apertures 43 in their periphery which act much like the tread of an automobile tire. The normal external diameter of rings 42 is slightly greater than the external diameter of the imprinting plates 22, by an amount substantially equal to the thickness of film 10 being formed on casting roll 3 to accommodate the film.

Optimum imprinting occurs when the nip between impression roll 21 and casting roll 3 is substantially coincidental with the frost line at 11. This condition can be readily obtained by adjusting the angular position of the impression and cooling rolls, with reference to the casting roll 3 to aline such nip with the frost line which, as previously stated, is visible to the operator. As an alternative but not as desirable, the frost line may be adjusted in a well known manner, such as by adjusting the casting roll speed or temperature, or the extent of free film travel 9, to bring the frost line coincidental with the nip between impression roll 21 and casting roll 3. Thus, in starting up printing operations, an operator can readily make initial adjustments, based upon observation, for obtaining optimum imprinting. In this connection, the visible impressions formed in the film may be regular printing type impressions or legends as indicated in FIGS. 2 and 4. These impressed areas are of duller and less glossy appearance compared to the remainder of the film.

The impressions may also be closely spaced roughened areas 46 to form an irregular surface on one face of the film as indicated in FIG. 5, thus providing a dull surface finish. Such dull surface finish is advantageous in the manufacture of black polyethylene film to be employed as mulch film because the irregular surface reduces reflection of sun rays into the eyes of the worker. The irregular dull finish can be readily obtained by uniformly roughening the outer surface of printing plate 22, such as by a grinding wheel, knurling or any other suitable means.

As an illustrative example of an embodiment of the invention, casting roll 3 is about 24 inches in diameter, and impression roll 21 and cooling roll 23 both about 8½ inches in diameter. At an operating speed of about 500 ft. per minute with conventional medium density polyethylene to form film at about 1 mil thickness, the extrusion temperature from extrusion die 2 is about 600° F. The casting roll 3 is cooled to about 105° F., and cooling roll 23 to about 75° F. Impression roll 21 may also be cooled to about the same temperature, if desired. These dimensions and temperatures are not, however, critical.

From the preceding, it is seen that an important commercial advantage of the invention is that should it be desired to change the printing plates to provide different imprints, this can be readily and quickly done without unduly tying up the apparatus as would otherwise be the case were printing means provided directly on the casting roll 3. Also, pre-treatment of the polyolefin film to take printing inks by the numerous methods known in the art with a subsequent separate step of applying printing by inks, are entirely eliminated.

I claim:

1. In the method of imprinting plastic film which sets from a viscous to a solid state along a frost line zone on a substantially even casting surface onto which the plastic is deposited in viscous state while one face of the film is in contact with said substantially even surface, the improvement comprising forming areas of optical properties different from the remainder of the film about such areas by cooling said one face of deposited film on said casting surface and effecting impressions on the opposite face of the film only at said zone against said substantially even surface and before said film has completely solidified.

2. In the method of imprinting plastic film which sets from a viscous to a solid state along a frost line zone on a continuously moving substantially even casting roll rotatable about an axis onto which the plastic is continuously deposited in viscous state while one face of the film is in contact with said substantially even surface, the improvement comprising forming areas of optical properties different from the remainder of the film about such areas by cooling said one face of deposited film on said casting surface and providing rotary impressing means at said zone, and continuously rotating said impressing means to effect impressions continuously on the opposite face of the film only at said zone against said substantially even surface and before said film has completely solidified.

3. In the method of imprinting polyolefin film which sets from a viscous to a solid state along a frost line zone on a continuously moving substantially even casting surface onto which the polyolefin is deposited in viscous state while one face of the film is in contact with said substantially even surface, the improvement comprising forming areas of optical properties different from the remainder of the film about such areas by cooling said one face of deposited film on said casting surface, and effecting impressions on the opposite face of the film only at said zone against said substantially even surface and before said film has completely solidified while simultaneously cooling said impressions.

4. In the method of imprinting plastic film which sets sharply from a viscous to a solid state along a frost line zone on a continuously moving substantially even casting surface onto which the plastic is continuously deposited in viscous state while one face of the film is in contact with said substantially even surface, the improvement comprising forming areas of optical properties different from the remainder of the film about such areas by cooling said one face of deposited film on said casting surface and effecting impressions on the opposite face of the film only at said zone against said substantially even surface and before said film has completely solidified, and cooling said impressions at a faster rate than the remainder of the film.

5. The method of claim 4 wherein the impressions are resiliently applied.

6. In the method of dull finishing a surface of polyolefin film which sets sharply from a viscous to a solid state along a frost line zone on a continuously moving substantially even casting surface onto which the polyolefin is deposited in viscous state while one face of the film is in contact with said substantially even surface, the improvement comprising forming areas of optical properties different from the remainder of the film about such areas by cooling said one face of deposited film on said casting surface and effecting closely spaced impressions on the opposite face of the film only at said zone against said substantially even surface and before said film has completely solidified to form an irregular surface, and cooling said impressions at a faster rate than the remainder of the film.

7. In the manufacture of polyolefin film which sets from a viscous to a solid state along a frost line zone on a continuously moving substantially even casting surface onto which the film is continuously deposited in viscous amorphous condition while one face of the film is in contact with said substantially even surface, the method of legibly optimumly marking said film which comprises providing areas thereon of duller and less glossy optical properties than the remainder of the film by impressing the opposite face of the film against said substantially even surface only at a nip coincidental with said frost line zone before the film has completely solidified.

8. The method of claim 7 wherein such impressions are resiliently applied.

9. The method of claim 7 wherein such impressions are applied by printing type.

10. The method of claim 7 wherein the film is black and such impressions are applied by closely spaced roughened areas to form a dull finished surface.

References Cited

UNITED STATES PATENTS

| | | | |
|---|---|---|---|
| 2,218,227 | 10/1940 | Winneck | 264—284 |
| 2,545,868 | 3/1951 | Bailey | 264—210 |
| 2,582,294 | 1/1952 | Stober | 264—210 |
| 2,791,801 | 5/1957 | Szantay | 264—210 |
| 2,821,746 | 2/1958 | Bicher | 214—210 |
| 2,867,001 | 1/1959 | Lewis | 264—284 |
| 3,256,376 | 6/1966 | Leedy | 264—210 |
| 3,154,608 | 10/1964 | Aronsen | 264—212 |
| 3,175,026 | 3/1965 | James | 264—212 |
| 3,311,692 | 3/1967 | Baird | 264—293 |

FOREIGN PATENTS

| | | |
|---|---|---|
| 711,466 | 1/1930 | France. |
| 1,184,072 | 12/1964 | Germany. |

ROBERT F. WHITE, *Primary Examiner.*

ROY B. MOFFITT, *Examiner.*

R. KUCIA, *Assistant Examiner.*